March 21, 1967 F. S. VIGLIANTE 3,310,635

DATA EXCHANGE IN A COMMON CONTROL COMMUNICATION SYSTEM

Filed Nov. 27, 1963 3 Sheets-Sheet 1

INVENTOR
F. S. VIGLIANTE
BY
R. C. Winter
ATTORNEY

DATA EXCHANGE IN A COMMON CONTROL COMMUNICATION SYSTEM

Filed Nov. 27, 1963 3 Sheets-Sheet 2

United States Patent Office 3,310,635 Patented Mar. 21, 1967

3,310,635

DATA EXCHANGE IN A COMMON CONTROL COMMUNICATION SYSTEM

Frank S. Vigliante, Piscataway Township, Middlesex County, N.J., assignor to Bell Telephone Laboratories, Incorporated, New York, N.Y., a corporation of New York Filed Nov. 27, 1963, Ser. No. 326,435
14 Claims. (Cl. 179—26)

Figure 1:
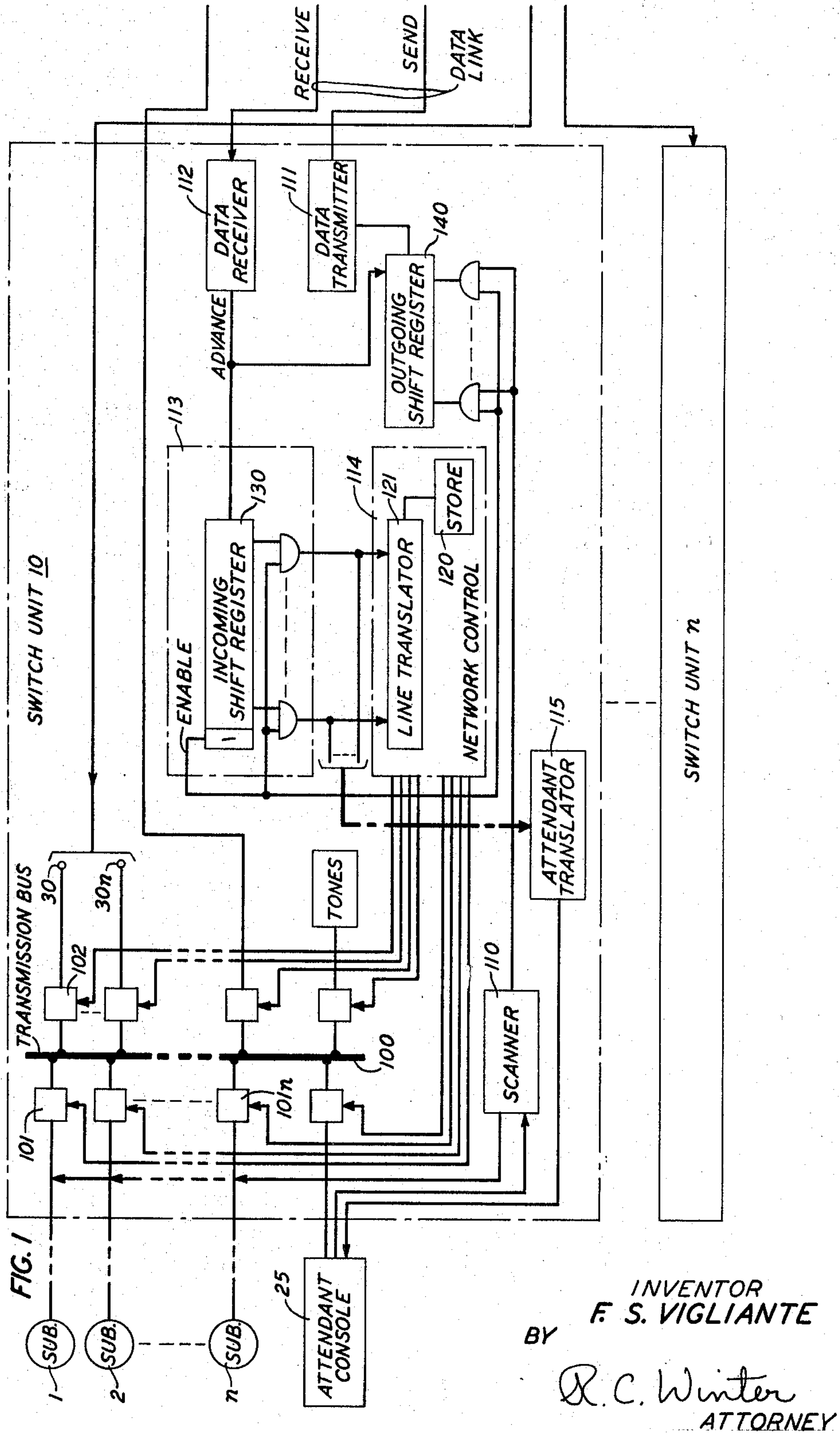

This invention relates to control facilities for a telephone system and more particularly to the common control of a plurality of private branch exchanges from a single unit remote from the PBX's, the operation of which is directed by a stored program.

From the point of view of the user, telephone service is acceptable if call connections are completed in a matter of seconds. Thus the mere substitution of high speed electronic devices for the slower electromechanical counterparts employed in contemporary systems would afford little advantage. The picture changes dramatically, however, when control operations for a number of isolated telephone exchanges are performed in common at a single location. In the latter case, with a large number of calls being processed concurrently, the high speed capabilities of a relatively small number of devices at the common control facility are realized.

Further advantages may be derived from such a system organization, particularly with a group of isolated PBX's, by utilizing stored program techniques in the common control unit. Such techniques envision the implementation of a predetermined series of actions in response to a set of instructions contained in a memory or program store. Such a set of instructions may be modified at will, thus providing flexibility at a common point to meet the individual needs of the considerable number of PBX customers it can serve.

It is a general object of this invention to provide an improved system.

It is another object of this invention to improve the operation of hte common control facility in a telephone system serving a plurality of private branch exchanges.

It is a further object of this invention to utilize stored program techniques to optimum advantage in the common control facility in the processing of all calls through the multiple PBX system.

These and other objects of this invention are attained in one specific illustrative embodiment comprising a telephone system having a plurality of isolated PBX switching units, the control functions of which are performed by a common control facility remote from the PBX's. A system of this type is disclosed, for example, by E. L. Seley, F. S. Vigliante and R. D. Williams in their patent application Ser. No. 252,797, filed Jan. 21, 1963, now Patent 3,268,669 issued Aug. 23, 1966. Data is transmitted to the control unit from the various PBX's for processing, after which operating instructions are returned to the PBX's for implementation. These instructions direct switching operations which serve to interconnect pairs of lines in communication on a time division basis.

The control facility of the instant embodiment, as in the E. L. Seley et al. system, is in two sections operating in different time cycles. The input-output section is in direct contact with all of the PBX switch units, and may receive messages from or transmit messages to each unit simultaneously. Transfers of information between the two sections of the control unit are in parallel form.

The principal functions of the call processing section are to establish and supervise calls through the system. For these purposes it records the status of each call and maintains this status current in accordance with the actions of the calling and called parties and the condition of equipment involved. The call status is maintained in a temporary memory, with updating accomplished under control exercised by a stored program. The program directs the correlation of new messages obtained from the input-output section with current status records and the dissemination of orders and information for subsequent system action.

In the aforementioned E. L. Seley et al. system, the input-output section stores all messages received from each switch unit in serial form until they are requested by the call processing section. Similarly, the input-output section receives messages from the call processing section for subsequent dissemination throughout the system. My invention improves upon the Seley et al. system by circumventing the storage facilities in the input-output section and transferring messages directly between the terminal facilities in the input-output section; viz., data receivers and transmitters, and the call status store in the call processing section. Such a direct transfer operation provides a considerable savings in time and equipment in the system control.

Message data is transferred as a train of binary digits or bits. In order to permit the transfer of message data between the switch units and the call processing section of the control unit utilizing only the terminal equipment of the input-output section, a bit of each outgoing message contained in the call status store is transmitted simultaneously to the corresponding switch unit and, in turn, each of the several switch units returns a bit of a new message contained therein simultaneously to the call status store in the control unit.

The call status store is arranged so as to store each group of message bits as received from the switch units, i.e., one bit from each switch unit, in a row of the memory Upon completion of this operation, a row of stored information bits, i.e., one bit for each of the switch units, is read out of the call status store and transmitted simultaneously to the corresponding switch units. The call status store organization is such that a message from a particular switch unit will be stored in a column of the call status store, while a single bit of each message for each of the switch units forms a row in the call status store. In addition, the control unit is programmed such that the information is stored in three distinct sections of the call status store. The input information is contained in a first section, comparisons with control information for purposes of establishing call connections are performed by placing the messages in a second section, and a third section contains the messages in condition for transmission to the switch units.

It is a feature of this invention that, in a telephone system in which a plurality of remote switch units are controlled by a common control unit containing a call status store, data indicating the condition of a line terminated on each of the switch units be transmitted simultaneously from the respective switch units to a distinct storage area allocated to each switch unit in the call status store.

It is another feature of this invention that under the direction of a stored program, the data initially stored in parallel columns in the call status store be rearranged in rows for subsequent use by the control unit.

It is a further feature of this invention that under the direction of a stored program, the data be restored to its initial alignment in parallel columns in the call status store and that a portion of each message be transmitted simultaneously to the corresponding switch units.

It is still another feature of this invention that, as each portion of a message is received in the corresponding switch unit, a portion of a new message be returned to the control unit.

It is still a further feature of this invention that means be provided at the control unit to delay storage of each received message portion until sufficient time has elapsed to permit receipt of a distinct message portion from each of the switch units.

Figure 2:
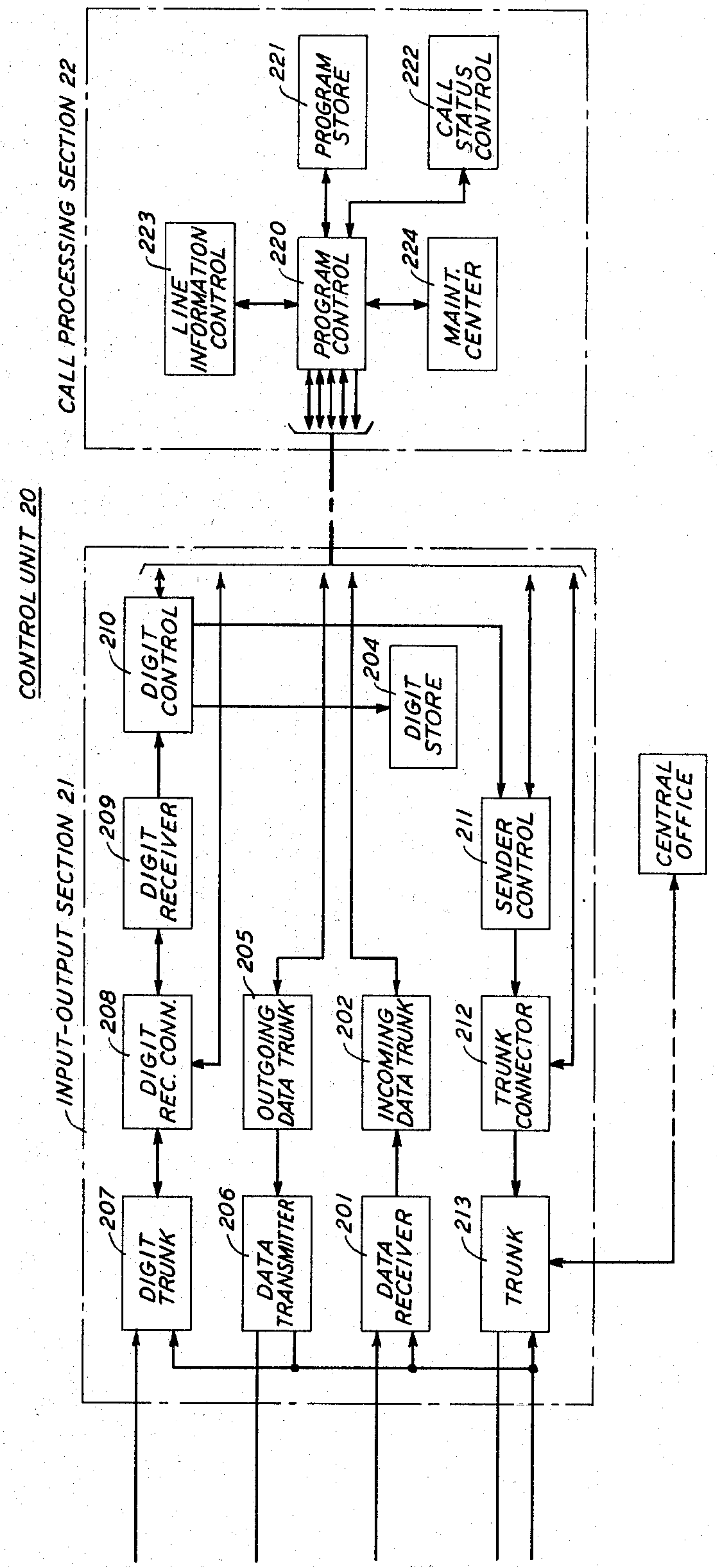
Figure 3:
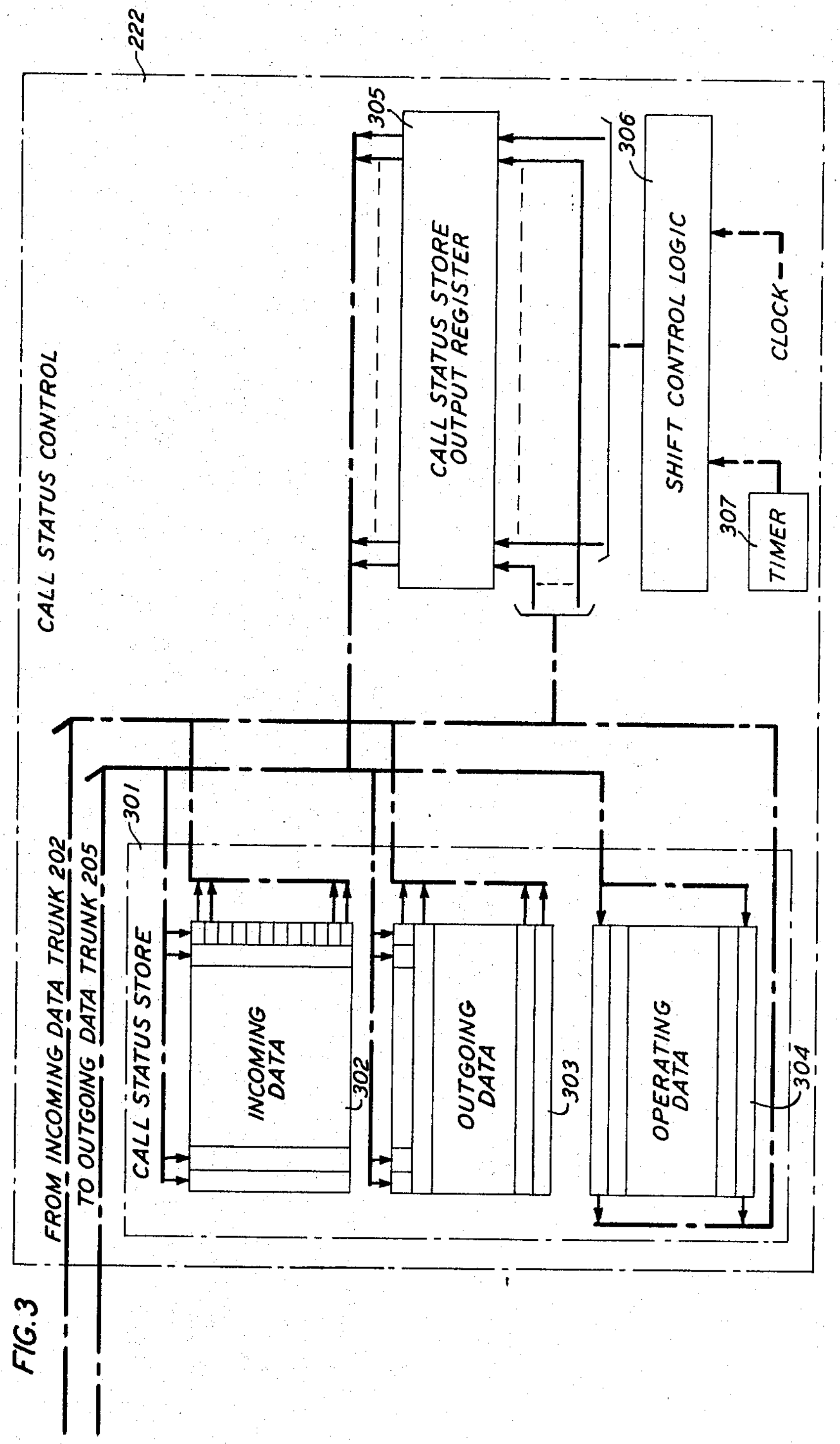

A complete understanding of this invention and of the above-noted and other features thereof may be gained from consideration of the following detailed description and the accompanying drawing, in which:

FIGS. 1 and 2 are block diagram representations of a private branch exchange system in accordance with an illustrative embodiment of this invention; and FIG. 3 depicts the arrangement of information stored in the call status store of the control unit.

Turning now to the drawing, the principal characteristics of one switch unit and the control unit for an electronic PBX system embodying this invention are illustrated in FIGS. 1 and 2. The switch unit 10 is essentially as described in detail in R. C. Gebhardt et al. application Ser. No. 195,199, filed May 16, 1962, now Patent 3,225,144 issued Dec. 21, 1965, but for purposes of understanding the over-all system operation, a brief description of the switch unit operation is provided herewith.

Time division switching is based on the principle that periodic samples of an information signal are sufficient to completely define the signal and that such samples, gleaned from a multitude of signals, may be transmitted in a regular sequence over a time-shared common path. Thus a plurality of terminal stations such as telephone subsets 1–*n* is connected to a common transmission link 100 through corresponding line gates, the latter being sampled on a selective basis for a predetermined time interval in a recurrent cycle of time intervals. If a pair of gates is closed simultaneously for the prescribed time interval, a sample of the information available at each terminal will be transferred to the opposite terminal via the common transmission link 100 and the low pass filters included in the line circuits corresponding to the active gates. Thus a bilateral connection is established which, although physically connected only a small fraction of the time, appears to be continuously connected because of the smoothing action of the line filters.

It is characteristic of contemporary PBX operations that they are self-contained, i.e., the transmission circuits, switching network and all control circuits, are located together on the customer's premises. The instant system, as indicated in the aforementioned Gebhardt et al. patent, extends the common control concept by having a centrally located control unit 20 which directs the call processing in all of the remotely located switch units 10 via corresponding data links. More specifically, the switch unit 10 informs the control unit 20 of all changes in the supervisory status of telephone lines, trunks and attendant console keys, e.g., whether they are idle (on-hook) or busy (off-hook). The control unit 20 then performs all of the decision-making tasks of call processing.

Reference may be made to the aforementioned Seley et al. system for a detailed analysis of the construction and operation of the various units shown in block form in FIGS. 1 and 2 other than incoming shift register 130 and outgoing shift register 140.

The operation of the switch unit 10 may be understood more fully upon consideration of a typical intra-PBX call. Assume telephone subset 1, FIG. 1, goes off-hook. This change of status is recognized by the scanner 110 which in turn formulates a message containing the corresponding line number and the new supervisory state. This information is transmitted to the control unit 20, FIG. 2, via data transmitter 111 and the send leg of the data link.

The control unit 20, recognizing that there is no current call established which involves this particular line, determines that the off-hook indication is a request for service and proceeds to set up a dialing connection. For this purpose a message is sent to the switch unit 10 via the receive leg of the data link, specifying that subset

1 be connected to a preselected digit trunk 207. This message is received by the data receiver 112 and transferred to the network control 114 via the data distributor 113. The network control in turn stores this message and translates it in order to effect connection of the appropriate line to the digit trunk in a predetermined time interval. At the same time the control unit 20 proceeds to connect the digit trunk 207 to a digit receiver 209 so as to transmit dial tone via the digit trunk 207 to the subset 1.

Dialing now is initiated at subset 1, or the digits representing the called line are otherwise transmitted to control unit 20. Upon completion of dialing, the control unit 20 sends a message to the switch unit 10 which removes the connection to the digit trunk and establishes instead a ringing connection to the called line with audible ringing returned to the calling party at telephone 1. When the called party answers, an off-hook message is sent via the data link to the control unit 20 which returns the message to the switch unit 10 to terminate ringing and establish a talking connection.

As indicated in this example, all changes in supervisory states result in a data message being transmitted from the scanner 110 in the remote switch unit 10 to the control unit 20. Answering messages from the control unit 20 are received in switch unit 10 over the data link and utilized by the network control 114 to establish appropriate connections in a predetermined time slot in each cycle of time slots. The content of the received message also determines its distribution in the switch unit 10 either to the network control 114 or through the attendant translator 115 to the attendant console 25.

It may be seen that all control operations are effected exclusive of the attendant console 25. Thus the attendant circuit is simply a translator with facilities for observing the condition of all telephones and trunks. The attendant facilities, however, operate in the same fashion as any telephone in exercising supervision.

The network control 114 consists of a store 120 to remember the calls in progress, which store is coupled through a line translator 121 to activate the appropriate time division gates 101–102 in the switching network. New information from the data distributor 113 is gated into the store 120 during a read cycle when the number of a particular time slot agrees with a particular store address. During a write cycle of the store, information is gated from the store 120 to the line translator 121. The output of the line translator 121 is directed simultaneously to any predetermined pair of line gates, thus effecting their operation during a predetermined time interval.

Trunks 213, FIG. 2, serve to connect PBX lines to other remote PBX's and to a central office. Tone sources other than dial tone, such as busy and audible ringing tones, are contained in the switch unit and have access through the line gates to the transmission bus 100. The control unit 20 merely controls the connection of the tone source as a called party.

In order to perform the direct transfer of data between a switch unit 10 and the control unit 20 in accordance with this embodiment of the invention, the switch unit 10 as described hereinbefore is modified so as to include incoming shift register 130 in the data distributor 113 and outgoing shift register 140 connected between the scanner 110 and the data transmitter 111. These shift registers, together with related gating circuitry, serve to receive data from the control unit a bit at a time for use by the switch unit and in turn to transmit data from the scanner 110 a bit at a time to the control unit 20 through the data transmitter 111. The manner in which these operations are performed will be described in detail in connection with the processing of a call through the system.

As indicated heretofore, the instant system comprises a number of remotely located PBX switch units 10–*n* which are subject to instructions received from a centrally located control unit 20. Advantageously, the control unit 20 may be located at a telephone central office, while the PBX switch units 10–$n$ may each be located in a different PBX customer's office.

The control unit 20, as disclosed more fully in the aforementioned Seley et al. system, performs all of the logical functions required to process calls through each of the remote switch units 10–$n$. It may, for ease of description, be divided into two major sections, viz., the input-output section 21, and the call processing section 22, the former comprising the equipment which communicates directly with each of the switch units 10–$n$ and central offices connected to the control unit 20, while the latter performs the actual processing required to establish and supervise calls at the various switch units 10–$n$. Thus the input-output section 21 receives information from all of the switch units and is capable of working with all of the switch units simultaneously. The call processing section, on the other hand, operates on one switch unit at a time and on one call at a time within a given switch unit. As each call is processed, any action required is formulated as a message and directed through the input-output section for transmittal to the proper switch unit. The two sections operate in independent time cycles. Also the input-output section 21 comprises wired logic as contrasted with the stored program which controls the call processing section 22.

As illustrated in FIG. 2, the input-output section 21 of the control unit 20 is arranged to handle three types of information. Thus data is received from one of the switch units 10 via data links indicating the supervisory status of the various lines. Data is transmitted to the switch units over these data links in the form of instructions or commands to connect and disconnect the various lines. Incoming data is received in a data receiver 201 and transferred to the call processing section 22 via an incoming data trunk 202. Outgoing data is transmitted to the switch unit via an outgoing data trunk 205 and a data transmitter 206. The input-output section 21 also receives call destination information from calling parties via digit trunks as they dial or otherwise outpulse digits designating called lines. The third type of information comprises commands from the call processsing section which are utilized for supervision of the trunks connecting the various switch units to each other or to central offices with provision for the outpulsing of line designation digits over these outgoing trunks.

As indicated heretofore, reference may be made to the aforementioned Seley et al. system for a detailed analysis of the construction and operation of each of the circuits illustrated in block form in FIG. 2.

The data receiver 201 is coupled to the send lead of each data link so as to receive messages indicating changes of state at stations in each switch unit. The messages are received in a patricular coded form consisting of frequency shift, binary pulses. The data receiver 201 comprises conventional elements capable of detecting and demodulating such coded information, placing it in a form which may be utilized by the data processsing equipment in the control unit 20. It also serves to recover timing signals from the various data links, which signals are used to indicate to the data processing equipment of the control unit 20 the beginning of each binary digit, as well as to regenerate output data signals.

The incoming data trunk 202 receives the data from the receiver 201 as a series of mark or space signals representing binary digits, together with appropriate synchronizing signals, and combines such information with timing signals from a clock circuit in conventional logic circuits comprising OR gates and flip-flops to route the data to the call processing section 22. In accordance with this invention, the data is delivered in parallel, information in the trunk corresponding to each switch unit 10 being sampled at a rate greater than the binary digit (bit) rate of the message. The logic circuitry is arranged so that each bit can be received and placed in storage in the call processing section 22 while preventing multiple sampling of any one bit regardless of the bit length.

The counterpart of the data receiver 201 is the data transmitter 206, which serves to convert the data elements of the messages presented to it to frequency shift binary pulses for transmission over the receive lead of the appropriate one of the data links to the designated switch unit. The transmitter 206 comprises conventional modulator, filter and transformer components for performing the necessary conversion.

The outgoing data trunk 205 is alerted by the call processing section 22 each time it is determined that a data element is due for transmission to a particular switch unit 10–$n$ corresponding to the alerted trunk 205. The outgoing trunk 205 utilizes this signal representing the binary digit 1, together with signals from the system clock, to generate and deliver to the data transmitter 206 a full length data element.

The digit transfer operation is identical to that performed in the aforementioned Seley et al. system. The digit trunk 207 connects a particular switch unit to a digit receiver 209 under control of the digit receiver connector 208. Thus digits received from the remote switch unit 10 in the digit trunk 207 are assigned to a particular digit receiver 209 via common links shared by all digit trunks connected to corresponding remote switch units. The circuit is bilateral, permitting transmission of dial tone generated at the digit receiver 209 to a switch unit 10.

The assignment of digit trunks such as 207 and digit receivers such as 209 is controlled by the digit receiver connector 208. It also commands the digit receiver 209 to transmit dial tone to the digit trunk 207. Upon receipt of all digits designating a particular called line in the digit receiver 209, the digit receiver connector 208 breaks down the connection between the digit receiver 209 and the digit trunk 207.

When the call processing section 22 requires that a particular digit receiver 209 be connected to a particular digit trunk 207 associated with a given switch unit 10, it transmits a message to the digit receiver connector 208 containing the designation of the switch unit, the digit trunk 207 and the digit receiver 209 involved, together with the fact that this is a new message.

This information is registered temporarily in the digit receiver connector 208, permitting the call processing section 22 to proceed to other tasks. The digit receiver connector 208 in turn locates the portion of a memory unit contained therein corresponding to the designated digit receiver 209 and proceeds to write the switch unit and digit trunk 207 designations in this area. The distinct areas in the memory unit corresponding to the various digit receivers 209 are scanned sequentially and information read out is held temporarily in a register. Concurrently, the designation of the storage area itself corresponding to the particular digit receiver 209 is also held in a temporary register. Subsequently, the information held in the temporary registers is transmitted through a pair of translators and serves to enable the time division switches in the designated digit trunk 207 and digit receiver 209 so as to permit the resonant transfer of information therebetween.

As this was designated as a new message by the call processing section 22, the translated designation of the digit receiver 209 also includes a command to enable a dial tone generator, such that on subsequent scans of this receiver, dial tone will be transmitted through the corresponding digit trunk 207 to the designated switch unit. The digit receiver 209 is also prepared to receive digits from the switch unit, the first one of which will reset the dial tone flip-flop so as to cut off dial tone transmission.

The digit receivers 209 are the connecting links between the digit trunks 207 and the digit control 210. As indicated heretofore, a digit receiver 209 under control of the digit receiver connector 208 is connected via a time division common bus to a particular digit trunk 207, which in turn corresponds to a particular one of the switch units 10–*n*.

Upon establishment of the connection, the digit receiver 209 furnishes dial tone to the switch unit and informs the digit control 210 when this has been done. When the digit signals converted to tone signals at the switch unit are received through the digit trunk 207, they are decoded in a conventional manner and combined with signals originated in the digit control 210 to permit the digit control 210 to select appropriate output signals from a particular digit receiver 209.

The first such digit signal received from a switch unit also causes the digit receiver 209 to stop sending dial tone. After the digit receiver 209 has completed its function, i.e., received all of the digits from the calling line designating a particular called line, as determined by the call processing section 22, it is disconnected from the digit trunk 207. It is then reset in a condition preparatory to its assignment to another call by the digit receiver connector 208 and so informs the digit control 210.

From the foregoing it is apparent that the basic function of the digit control 210 is to provide for the insertion of digit information concerning a called line, as provided to the digit store 204 by a calling line. This information is obtained by the digit control 210 from sampling the various digit receivers 209. It further determines when all or part of the stored digits should be transferred to the call processing section 22 for the latter's analysis and cooperative action. It also functions in conjunction with the sender control 211 on calls placed to areas remote from the switch unit originating the call.

The basic operation of the input-output section 21 may be illustrated by the establishment of a connection between a calling party in switch unit 10 and a called party reached through the central office, FIG. 2. When the calling party originates the call, switch unit 10 observes the off-hook condition on the calling line and transmits the line identification and the off-hook condition indication serially via the data link to the corresponding data receiver 201 in the input-output section 21. This information then is transferred in parallel with a data bit from each of the other switch units to the call processing section 22 which in turn locates an idle digit trunk 207 and receiver 209.

Subsequently, instructions are returned through the data control portion and, via the data link, to switch unit 10 for connection of a preselected digit trunk to the calling line in the time interval assigned to the call. The digit portion of the input-output section 21 also receives appropriate commands from the call processing section 22 so as to permit interconnection of a predetermined digit trunk 207 and receiver 209 in the assigned time interval.

Following assignment of a digit receiver 209 to a call, dial tone is applied through the digit trunk 207 to the calling line. The calling party, upon receiving dial tone, proceeds to dial or otherwise designate the digits of the called line. The digit signals pass through the digit trunk 207 and are received in the assigned digit receiver 209.

Whereas the input-output section 21 is arranged to monitor active and prospective calls in each of the remote switch units 10–*n* concurrently, the call processing section 22, FIG. 2, processes a single call at a time. Processing of any one call involves a number of steps as the connection is being established and disestablished. The call processing section 22 maintains a record of each of these steps in the processing of a call, thus keeping itself currently advised as to the status of every call in the system. As indicated heretofore, reference may be made to the aforementioned Seley et al. system for a detailed analysis of the construction and operation of each of the circuits illustrated in block form in the call processing section 22.

The status of each call is observed periodically and compared with information received from the input-output section 21 so as to maintain a current status record for each call, the recorded status being updated upon receipt of each new condition report as the temporary record is observed. Such call status records are maintained in the call status control 222, one of the three major units in the call processing section which will be described more fully hereinafter with reference to FIG. 3.

A second major unit is the program control 220. The record of each call maintained in the call status control 222 contains a distinct indication as to the current state of a call indicative of the progress made to date in the establishment of the connection. As the status of each call is observed, this call status indication or progress mark is transmitted to the program control 220 where it is utilized to address a storage unit designated the program store 221. Such action triggers the program store 221 to provide a chain of commands to equipment throughout the call processing section 22 which eventually serves to update the information contained in the call status control 222 and, in some instances, to provide operating instructions to the input-output section 21 in order to permit implementation of the actual call connections in the remote switch units 10–*n*.

Thus the call processing section 22 may be said to operate in accordance with a stored program. The primary characteristic of such program controlled system operations is the utilization of a program or series of commands permanently stored in the system, which commands are carried out by the system on a selective basis in accordance with instructions to the program in the form of addresses, each distinct address initiating a distinct series of commands.

The third major unit in the call processing section is the line information control 223, which contains information concerning each line and trunk in the entire system, ancillary matters such as class of service to which a particular line is entitled, abbreviated directory numbers, toll call diversion, compressed outpulsing translations, et cetera. Such information is available upon request by the program control 220 as desired in the processing of a particular call. When interrogated, the line information control 223 will deliver information to the call status control 222, where further processing of the call will take place.

The call processing section 22 systematically interrogates the call staus control 222 for new information concerning a particular call that it is currently processing such information including on- or off-hook messages, digit pulsing completed, et cetera. Following the instructions contained in the program store 221, the call processing section 22 interprets data received from the switch unit originating the particular call being processed, subsequently informs the same switch unit via the input-output section 21 as to which connections to establish or disestablish in order to satisfy any indicated change of status in the instant call. The call processing operation thus may be seen to comprise collecting information from the switch units, comparing such information with the current recorded status of a call, and advising the switch units to take appropriate action while updating the status of the call, each operation being under the control of instructions received from a stored program.

The call status control 222 is illustrated in FIG. 3. Reference may be made to the aforementioned Seley et al. system for a detailed analysis of the construction and operation of the call status store output register 305, the shift control logic 306, and the operating data unit 304 which corresponds to the call status store in the Seley et al. system.

Call status store 301 contains the temporary information concerning the current status of each call or prospective call through the system. In accordance with the illustrative embodiment of this invention, the call status store 301 may be considered as being divided into three distinct stores; viz., the incoming data store 302, the outgoing data store 303, and the operating data store 304, each store having the construction of the call status store described in the Seley et al. system. This division facilitates the desired parallel data transmission and reception between the control unit and the various switch units. Thus, as indicated heretofore, a single binary digit or bit from each switch unit is received simultaneously via the corresponding incoming data trunk 202 at the incoming data store 302 of the call status store 301.

The incoming data store 301 is organized to accommodate the parallel input of a bit from each switch unit. Thus, as illustrated, this organization may take the form of vertical message columns, each column corresponding to a distinct switch unit. After sufficient consecutive bit transfers, a complete message from a given switch unit will be stored in a corresponding column of the incoming data store 302. At this time the program control 220 will activate the call status control 222 so as to transfer the complete message from the column of the incoming data store 302 via the call status store output register 305 to a row of the operating data store 304 corresponding to the switch unit involved.

Timer 307, comprising elements well known in the art, operates through the shift control logic 306 to determine the particular time at which a transfer of a bit from each switch unit to the incoming data store 302 via the call status store output register 305 is to be implemented. This is required due to the difference in transmission time between the control unit 20 and the various switch units 10–*n* which may be located at varying distances from the control unit 20. Thus, although individual message bits are received in the call status store output register 305 as transmitted from the corresponding switch units 10–*n*, the timer 307 will not permit the simultaneous transfer of such message bits from the call status store output register 305 to the incoming data store 302 until sufficient time has elapsed for a message bit to be received from the switch unit most remote from the control unit 20.

Interleaved with the receipt of message bits from the switch units is the transmission of a message bit from the outgoing data store 303 to each of the switch units 10–*n*. For this purpose the outgoing data store 303 is organized in columns similar to the organization of the incoming data store 302. The call processing section 22 is programmed such that messages in the operating data store 304 are transferred via the call status store output register 305 to the outgoing data store 303 when it is desired to transmit messages to the various switch units 10–*n*. Since the messages as contained in the operating data store 304 are stored in rows, they must be rearranged in columns in the outgoing data store 303 to permit the simultaneous transfer of one bit of each message to the corresponding switch units.

The information is arranged in the operating data store 304 in such a manner that the status of each call may be observed in sequence in a recurring cycle. To facilitate such observation, a distinct portion of the store 304 is allotted to each of the remote switch units in the system, depending upon the traffic requirements encountered in the respective switch units. These portions or sectors in turn are subdivided into subsectors, there being a subsector corresponding to each time slot in a particular switch unit. Such subsectors serve to record all the necessary information as to the current status of a call. This arrangement is similar to the call status store illustrated in the aforementioned Seley et al. system.

Generally, the performance of the operating data store 304 of the call status store 301 is as follows: A progress mark indicating the current state of the call being handled by the switch unit in the time slot corresponding to the subsector in which it is found, is read from the subsector and transmitted to the program control 220 where it initiates a distinct stored program sequence for processing the call. If this sequence is of such a nature as to change the status of the call, appropriate information is added to or deleted from the corresponding subsector of the store 304. Upon completing the interrogation of a particular subsector, the progress mark contained in the next subsector is read and the sequence repeated. After all subsectors have been investigated in sequence, the cycle is repeated.

In addition, distinct programs are available, one being initiated at the beginning of each sector and another at the end of each sector. Thus, as a particular sector of the store 304, corresponding to a particular switch unit, is reached in the sequence, the beginning of sector scan routine is initiated. In interrogates the incoming data store 302 for new input data from the corresponding switch unit, such as a line changing from the idle to the active states. It transfers such originating messages from the incoming data store 302 to the operating data store 304, classifying the messages as pertaining to extensions, trunks, attendants, or maintenance facilities. During the ensuing sector scan of store 304, the new input message is compared with active numbers which are recorded in the call status subsectors. At the same time all active calls recorded in the subsectors are updated as required.

Upon completion of the sector scan, the special end of sector scan routine is initiated to determine whether or not a match was obtained between the new information and the previously recorded information. If no match is indicated, a new request for service is assumed. The end of sector scan routine is then responsible for the location of an idle time slot for use by this call, an idle digit trunk 207 to the originating switch unit, and an idle digit receiver. It thereupon serves to interconnect the assigned digit receiver and digit trunk in the input-output section 21. In addition, it records in the subsector corresponding to the selected time slot the numbers indicative of the calling line, the assigned digit trunk and the assigned digit receiver. Finally, it provides for the placement of the appropriate progress mark in the assigned subsector of unit 304 of call status store 301, indicating that the control unit 20 is prepared to receive digits from the calling line indicative of the called line.

Concurrently, dial tone is provided to the calling line by the assigned digit receiver. If, for any reason, any of the above assignments are not possible in the current allotted interval, the calling line designation is placed in a top priority call waiting status and the assignment sequence is repeated during succeeding sector scans until successful, at which time dial tone will be provided.

Information read out of the three stores of the call status store 301 is placed in the call status store output register 305. The register 305 serves as a central accumulator for the system. Most of the operations performed by the stored programs involve this register in some way. It is a conventional shift register as known in the art which, upon command from the program control 220, is capable of performing many functions, e.g., shifting its content either to the right or to the left or altering its content by the addition of a single bit.

With this flexibility, the call status store output register 305 serves as the common gating point in the call processing section 22. Thus all information received from the input-output section 21 for processing will be transmitted through the register 305 at some point so as to be exposed to the commands also received by the register 305 from the program store 221. Similarly, final orders to the balance of the system as to actions to be taken to implement a particular call will pass through the register 305.

The shift control logic 306 performs the various functions necessary for the operation of the output register 305 and various counters and timing circuitry. These functions include the recognition of commands, the gating and inhibiting of clock pulses in accordance with a given command, and the monitoring of the shift processes in order to detect when the desired length of shift has occurred. For these purposes the shift control logic 306 contains various logic circuits such as AND and OR gates and flip-flops, as well known in the art.

The purpose of the program control 220 is to provide and translate commands for system action. The commands are stored as individual programs in the program store 221. In response to an address, as provided by the progress mark in each subsection of the operating data store 304, a specific corresponding program or sequence of commands will be produced by the program store 221. The program control 220 contains all of the necessary circuitry for insuring accurate translation of the commands. Its outputs are transmitted throughout the entire control unit 20, thereby implementing the actions specified by the particular program initially addressed. Thus, in this system environment, the program control 220 satisfies the actions required to advance the status of a call through the system from one state to the next.

In establishing a call connection, a prescribed sequence of events must occur prior to the actual talking connection. As indicated heretofore, each distinct state in this sequence of events bears a corresponding progress mark, each such progress mark initiating one of several alternative programs and consequent system actions dependent upon current system conditions. The particular chosen program determines the particular ensuing sequence of actions, serving to advance the status of the call from one progress mark to the next. Action is initiated upon readout of the progress mark stored in the subsector of the operating data unit 304 currently under observation. It in turn initiates a sequence of instructions from the store 221 which in turn result in corresponding actions, depending upon current system conditions. The program control 220 acts upon these instructions so as to advance the status of the call as far as the current program will permit, at which point a new progress mark will be inserted in the currently observed subsector of the operating data store 304. Thereafter, the operation is advanced to the next subsector, and its progress mark initiates another sequence of program controlled actions.

It may be seen, therefore, that the call processing section 22 is involved in the processing of a single call at a time, and it will require a number of cyclical observations of the various subsectors in the operating data store 304 to finally establish the call connection as well as to disestablish a connection.

As indicated heretofore, call processing is simply the collection of new information from each of the switch units 10–*n*, comparing it with information previously stored in the operating data store 304, and implementing and recording all actions dictated by the received information as it affects the current status of the call in accordance with instructions or commands received from the program store 221. The following description of a routine call through the system examines in particular the data transfer between the control unit 20 and the various switch units 10–*n*. For simplicity, it is assumed that all equipment required to complete the connection is idle, thus omitting special operations requiring alternate routes. However, such special operations utilize the basic equipment in a manner similar to that described in connection with the routine call.

The call begins under control of the switch unit and input-output section 21, as described earlier. When the calling line goes off-hook, the scanner 110 in the switch unit 10 recognizes the change of state and pauses in its scan long enough to transmit the line and condition identity to outgoing shift register 140, FIG. 1. The information thus stored in the output shift register 140 is delivered a bit at a time to the call status control 222 via the corresponding data transmitter 111, send leg of the data link, data receiver 201, and incoming data trunk 202. Each bit of information is transmitted from the outgoing shift register 140 in response to advance and enable signals received from the data receiver 112 and incoming shift register 130, respectively. Such signals result from the receipt in the switch unit 10 of a bit of information from the call status control 222 via outgoing data trunk 205, data transmitter 206, and the receive leg of the corresponding data link. As each bit of a data message is received at the corresponding switch unit, it is recorded in the incoming shift register 130 of the data distributor 113. When sufficient time has elapsed for a data bit to be transmitted from the control unit 20 to the most remote switch unit 10–*n* and a data bit to be received therefrom, the control unit will have received a data bit from each of the switch units. These incoming bits are then gated directly from the respective incoming data trunks 202 to the call status store output register 305 and from there to the appropriate storage locations in the incoming data store 302.

Upon completion of this storage operation, the outgoing data store 303 will deliver the next data bit for each switch unit to the call status store output register 305 and from there to the respective data transmitters 206 via he outgoing data trunks 205. Upon receipt of this data bit in the respective switch units 10–*n*, the corresponding data receiver 112 will provide an advance signal to the outgoing shift register 140 to initiate transmission of the next data bit from the corresponding switch unit to the control unit 20. This process continues until complete messages have been transmitted in both directions.

It is desirable, for ease of data processing, that the transmission of the first data bit of a message from the control unit to the appropriate switch unit 10–*n* immediately precede transmission of the first data bit of a message from a switch unit to the control unit. In order to accomplish this, the gating operation required to transfer information from the scanner 110 to the outgoing shift register 140 is controlled by receipt of the "start" bit preceding an incoming message in the highest order position of the incoming shift register 130. In addition to enabling the scanner output gating operation, the "start" bit also enables the gating of the incoming message to the network control 114 and the attendant console 25. When these actions are completed, the incoming shift register 130 is cleared and the switch unit 10 is ready to receive and send new messages.

At the control unit, each time a data bit is transmitted from the outgoing data store 303 via the call status store output register 305, a round trip timer 307 is reset. The program control 220 will monitor timer 307 until an indication is received therefrom that the round trip transmission time between the control unit 20 and the most remote one of the switch units 10–*n* has elapsed. Upon receipt of this indication, the program control 220 will initiate action via the shift control logic 306 to transmit and receive a new set of data bits and reset the timer 307. The control unit 20 is also programmed to transfer complete messages from the incoming data store 302 to the operating data store 304 via the call status store output register 305 as required in the subsequent processing of the call. Similarly, processed messages to be delivered to a particular switch unit for action are first transferred from the operating data store 304 to the outgoing data store 303 via the call status store output register 305. Thereafter, functions necessary to the establishment of the call, such as receipt and recordation of dialed digits, are performed in the manner set forth in the aforementioned Seley et al. system.

It is to be understood that the above-described arrangement is illustrative of the application of the principles of the invention. Numerous other arrangements may be devised by those skilled in the art without departing from the spirit and scope of the invention.

What is claimed is:

1. In a telephone system, a control unit, a plurality of switch units remote from said control unit, each of said switch units terminating a plurality of lines and comprising means responsive to a change in the condition of a terminated line for producing a multibit message defining the new condition, means for transmitting one bit of a multibit control message from said control unit simultaneously to each of said switch units, means in each of said switch units responsive to receipt of said control message bit for transmitting a bit of said condition message to said control unit, and timing means operative upon elapse of sufficient time for transmission of a message bit to and from the switch unit most remote from said control unit for storing in said control unit the condition message bits transmitted from each switch unit.

2. A telephone system comprising a control unit and a plurality of switch units remote from said control unit, each of said switch units terminating a plurality of lines, means in said control unit for transmitting distinct multibit messages to each of said switch units, a bit of each of said control messages being transmitted simultaneously, a register in each of said switch units for storing a multibit message defining a change in the condition of one of said terminated lines, and means responsive to receipt in each of said switch units of a control message bit for enabling the corresponding register to transmit a bit of said line condition message to said control unit.

3. A telephone system according to claim 2, wherein said control unit comprises storage means and timing means operative after sufficient time has elapsed for the round trip transmission of a message bit between said control unit and said switch unit most remote from said control unit for enabling the transfer to said storage means of the line condition message bits received concurrently from each of said switch units.

4. A telephone system according to claim 3, wherein said storage means comprises an incoming data store having data storage areas arranged in rows and columns, each column in said incoming data store accommodating a message from a distinct one of said switch units, and further comprising means for storing said condition message bits received concurrently from each of said switch units in a distinct row of said incoming data store.

5. A telephone system according to claim 4, wherein said storage means further comprises an operating data store having data storage areas arranged in rows and columns, each row in said operating data store being arranged to accommodate a multibit message pertaining to a distinct one of said switch units, and means for transferring a message from a column of said incoming data store to a corresponding row of said operating data store.

6. A telephone system according to claim 5, wherein said storage means further comprises an outgoing data store having data storage areas arranged in rows and columns, each column in said outgoing data store being arranged to accommodate a multibit message pertaining to a distinct one of said switch units, means for transferring the data bits contained in a column of said operating data store to a corresponding row of said outgoing data store, and means for transmitting the content of a column of said outgoing data store simultaneously to said switch units, a distinct data bit being transmitted to each switch unit.

7. A telephone system comprising a control unit and a plurality of switch units remote from said control unit, means in said control unit for transmitting a distinct message to each of said switch units, a portion of each of said control unit messages being transmitted simultaneously, a register in each of said switch units for storing a message to be transmitted to said control unit, and means responsive to receipt in each of said switch units of the portion of said control unit message directed thereto for activating the corresponding register to transmit a portion of said switch unit message to said control unit.

8. A telephone system according to claim 7, wherein each of said switch units comprises means responsive to the receipt of a distinct signal from said control unit for enabling said activating means in order to synchronize the transmission of messages from each of said switch units to said control unit.

9. A telephone system according to claim 7, wherein said control unit comprises a register for receiving the transmitted portion of each switch unit message, an incoming data store arranged to accommodate a message from each switch unit in a corresponding column of storage areas, and means for transferring the content of said control unit register to a row of storage areas in said incoming data store.

10. A telephone system according to claim 9, wherein said control unit further comprises an operating data store having data storage areas arranged in rows and columns, each row in said operating data store accommodating a message pertaining to a distinct one of said switch units, means for transferring a column of data from said incoming data store to said control unit register, and means operative thereafter for transferring the content of said control unit register to a row of said operating data register.

11. A telephone system according to claim 10, wherein said control unit further comprises an outgoing data store having data storage areas arranged in rows and columns, each column in said outgoing data store accommodating a message pertaining to a distinct one of said switch units, means for transferring the content of a column in said operating data store to said control unit register, and means operative thereafter for transferring the content of said control unit register to a row in said outgoing data store.

12. A telephone system according to claim 11, wherein said control unit further comprises means for transferring the content of a column in said outgoing data store to said control unit register, and means operative thereafter for transferring a distinct portion of the content of said control unit register to each of said switch units.

13. A telephone switching system comprising a plurality of suboffices, each of the suboffices terminating a plurality of lines, means at each suboffice for determining the supervisory state of the corresponding lines, a control unit common to all of the suboffices, memory means in said control unit for maintaining records of the supervisory state of active lines at each suboffice, means for transmitting a portion of each of a plurality of messages simultaneously to said suboffices, each transmitted message portion being directed to the corresponding suboffice, means at each suboffice responsive to receipt of the corresponding message portion for transmitting a portion of a new message to said control unit, and means at the control unit for storing the new message portion received from each suboffice.

14. A telephone switching system according to claim 13, wherein said control unit further comprises means for delaying the operation of said storing means until sufficient time has elapsed for a message portion to be transmitted in both directions between said control unit and said switch unit most remote from said control unit.

References Cited by the Examiner

UNITED STATES PATENTS

| | | | |
|---|---|---|---|
| 3,113,183 | 12/1963 | Townsend | 179—18.3 |
| 3,172,956 | 3/1965 | Inose et al. | 179—15 |

KATHLEEN H. CLAFFY, *Primary Examiner.*

L. A. WRIGHT, *Assistant Examiner.*